(12) United States Patent
Ekshinge et al.

(10) Patent No.: US 11,448,355 B2
(45) Date of Patent: Sep. 20, 2022

(54) VACUUM INSULATED REFRIGERATOR STRUCTURE WITH FEATURE FOR CONTROLLING DEFORMATION AND IMPROVED AIR WITHDRAWAL

(71) Applicant: WHIRLPOOL CORPORATION, Benton Harbor, MI (US)

(72) Inventors: Sunil S. Ekshinge, Pune (IN); Arunkumar Harikrishnasamy, Stevensville, MI (US); Lynne F. Hunter, Dorr, MI (US); Sai B. Krishna, Pune (IN); Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/146,546

(22) Filed: Jan. 12, 2021

(65) Prior Publication Data
US 2022/0221099 A1    Jul. 14, 2022

(51) Int. Cl.
| | | |
|---|---|---|
| *F16L 59/065* | (2006.01) | |
| *F25D 23/06* | (2006.01) | |
| *F25D 29/00* | (2006.01) | |
| *F25D 23/08* | (2006.01) | |

(52) U.S. Cl.
CPC .......... *F16L 59/065* (2013.01); *F25D 23/062* (2013.01); *F25D 23/063* (2013.01); *F25D 23/065* (2013.01); *F25D 23/066* (2013.01); *F25D 23/085* (2013.01); *F25D 29/00* (2013.01); *F25D 2201/14* (2013.01)

(58) Field of Classification Search
CPC .... F16L 59/065; F25D 23/062; F25D 23/063; F25D 23/065; F25D 23/066
See application file for complete search history.

(56) References Cited

U.S. PATENT DOCUMENTS

| | | |
|---|---|---|
| 4,536,990 A | 8/1985 | Siegrist et al. |
| 6,230,500 B1 | 5/2001 | Mao et al. |
| 8,944,541 B2 | 2/2015 | Allard et al. |
| 9,574,819 B2 | 2/2017 | Kang et al. |

(Continued)

FOREIGN PATENT DOCUMENTS

| | | |
|---|---|---|
| CN | 103968196 B | 10/2017 |
| EP | 1335171 A1 | 8/2003 |

(Continued)

*Primary Examiner* — Daniel J Rohrhoff
(74) *Attorney, Agent, or Firm* — Price Heneveld LLP (57) ABSTRACT

A vacuum insulated structure includes a first cover member of a stamped unitary sheet defining a perimeter portion positioned at a first planar level and a reinforcing member formed in the interior sheet extending to a second planar level spaced axially outward and disposed radially inward of the perimeter portion. The vacuum insulated structure also includes a second cover member and a thermal bridge interconnecting the first cover member and the second cover member at the perimeter portions thereof to define an insulating cavity therebetween. The insulating cavity is a sealed cavity having a vacuum drawn therefrom, and the first reinforcing member is configured to reduce deformation of the first cover member in at least an area adjacent the reinforcing member and to define a portion of a path for air flow out of the sealed cavity during a vacuum draw process.

20 Claims, 9 Drawing Sheets

(56) References Cited

U.S. PATENT DOCUMENTS

| | | | |
|---|---|---|---|
| 10,337,788 B2 | 7/2019 | Jung et al. | |
| 10,385,610 B2 | 8/2019 | Artwohl et al. | |
| 10,465,974 B2* | 11/2019 | Jung | F25D 23/085 |
| 10,591,199 B2* | 3/2020 | Jung | F25D 21/04 |
| 10,619,912 B2 | 4/2020 | Liu et al. | |
| 10,697,696 B1* | 6/2020 | Ekshinge | F16L 59/065 |
| 10,697,698 B2* | 6/2020 | Dherde | B21D 22/022 |
| 2007/0227179 A1* | 10/2007 | Yoo | F25D 23/066 |
| | | | 62/298 |
| 2010/0187241 A1 | 7/2010 | Hanke | |
| 2013/0256319 A1 | 10/2013 | Kuehl et al. | |
| 2016/0258671 A1 | 9/2016 | Allard et al. | |
| 2017/0190081 A1 | 7/2017 | Naik et al. | |
| 2018/0003427 A1 | 1/2018 | Godbole | |
| 2019/0128594 A1 | 5/2019 | Allard et al. | |
| 2019/0137166 A1* | 5/2019 | Dherde | F25D 23/062 |
| 2019/0145697 A1 | 5/2019 | Naik et al. | |
| 2019/0285336 A1* | 9/2019 | Naik | F25D 23/063 |
| 2020/0103067 A1* | 4/2020 | Allard | F16L 59/065 |

FOREIGN PATENT DOCUMENTS

| | | |
|---|---|---|
| GB | 760338 | 10/1953 |
| GB | 730146 | 5/1955 |
| JP | 4580843 B2 | 11/2010 |
| JP | 2013088036 A | 5/2013 |
| JP | 5689387 B2 | 3/2015 |
| KR | 100541061 B1 | 1/2006 |
| KR | 20190092602 A | 8/2019 |
| TW | 1494530 B | 8/2015 |
| WO | 2020158012 A1 | 8/2020 |

\* cited by examiner

VACUUM INSULATED REFRIGERATOR STRUCTURE WITH FEATURE FOR CONTROLLING DEFORMATION AND IMPROVED AIR WITHDRAWAL

BACKGROUND OF THE DISCLOSURE

The present disclosure generally relates to a vacuum insulated structure for a refrigerator, and more specifically, to cover member geometry for controlling the effects of vacuum evacuation on the structure.

SUMMARY OF THE DISCLOSURE

According to one aspect of the present disclosure, a vacuum insulated structure includes a first cover member of a stamped unitary sheet defining a perimeter portion positioned at a first planar level and a deformation control member formed in the unitary sheet extending to a second planar level spaced axially outward and disposed radially inward of the perimeter portion. The vacuum insulated structure also includes a second cover member and a thermal bridge interconnecting the first cover member and the second cover member at the perimeter portions thereof to define an insulating cavity therebetween. The insulating cavity is a sealed cavity having a vacuum drawn therefrom, and the first deformation control member is configured to reduce deformation of the first cover member in at least an area adjacent the deformation control member and to define a portion of a path for air flow out of the sealed cavity during a vacuum draw process.

According to another aspect of the present disclosure, a refrigerator includes a first cover member of a stamped unitary sheet defining a perimeter portion positioned at a first planar level and a deformation control member formed in the unitary sheet extending to a second planar level spaced axially outward and disposed radially inward of the perimeter portion. The deformation control member is configured as a first rib defining an open interior portion extending axially outward of an inner surface of the first cover member. The rib extends along an axis disposed at an angle of between 15° and 75° with respect to an edge of the cover member comprising the perimeter portion. The refrigerator further includes a second cover member and a thermal bridge interconnecting the first cover member and the second cover member at the perimeter portions thereof to define an insulating cavity therebetween. The insulating cavity is a sealed cavity having a vacuum drawn therefrom, and the first deformation control member is configured to reduce deformation of the first cover member in at least an area adjacent the rib.

According to yet another aspect of the present disclosure, a refrigerator includes a first cover member of a stamped unitary sheet defining a perimeter portion positioned at a first planar level and a deformation control member formed in the unitary sheet extending to a second planar level spaced axially outward and disposed radially inward of the perimeter portion. The deformation control member is configured as a stepped area defined by a stepped segment of the first cover member extending to the second planar level from toward the first planar level. The refrigerator further includes a second cover member, a thermal bridge interconnecting the first cover member and the second cover member at the perimeter portions thereof to define an insulating cavity therebetween, an insulating material disposed within the insulating cavity, and a mesh material layer received in the stepped area. The insulating cavity is a sealed cavity having a vacuum drawn therefrom, and the first deformation control member is configured to reduce deformation of the first cover member in at least an area adjacent the deformation control member and to define a portion of a path for air flow out of the sealed cavity during a vacuum draw process. The mesh material layer is configured to maintain the insulating material out of the portion of the air flow path defined within the stepped area.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a vacuum insulated structure for a refrigerator. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element. As used herein, the term "about" may be used to modify a dimension or other numeric value to indicate an approximate value that may, for example, encompass various manufacturing tolerance ranges and/or errors in measurement techniques and associated tools or devices, as are generally known in the art. Additionally or alternatively, the term "about" may indicate that the associated measurement of value may vary from that listed by +/−10%.

Figures 2A, 2B:
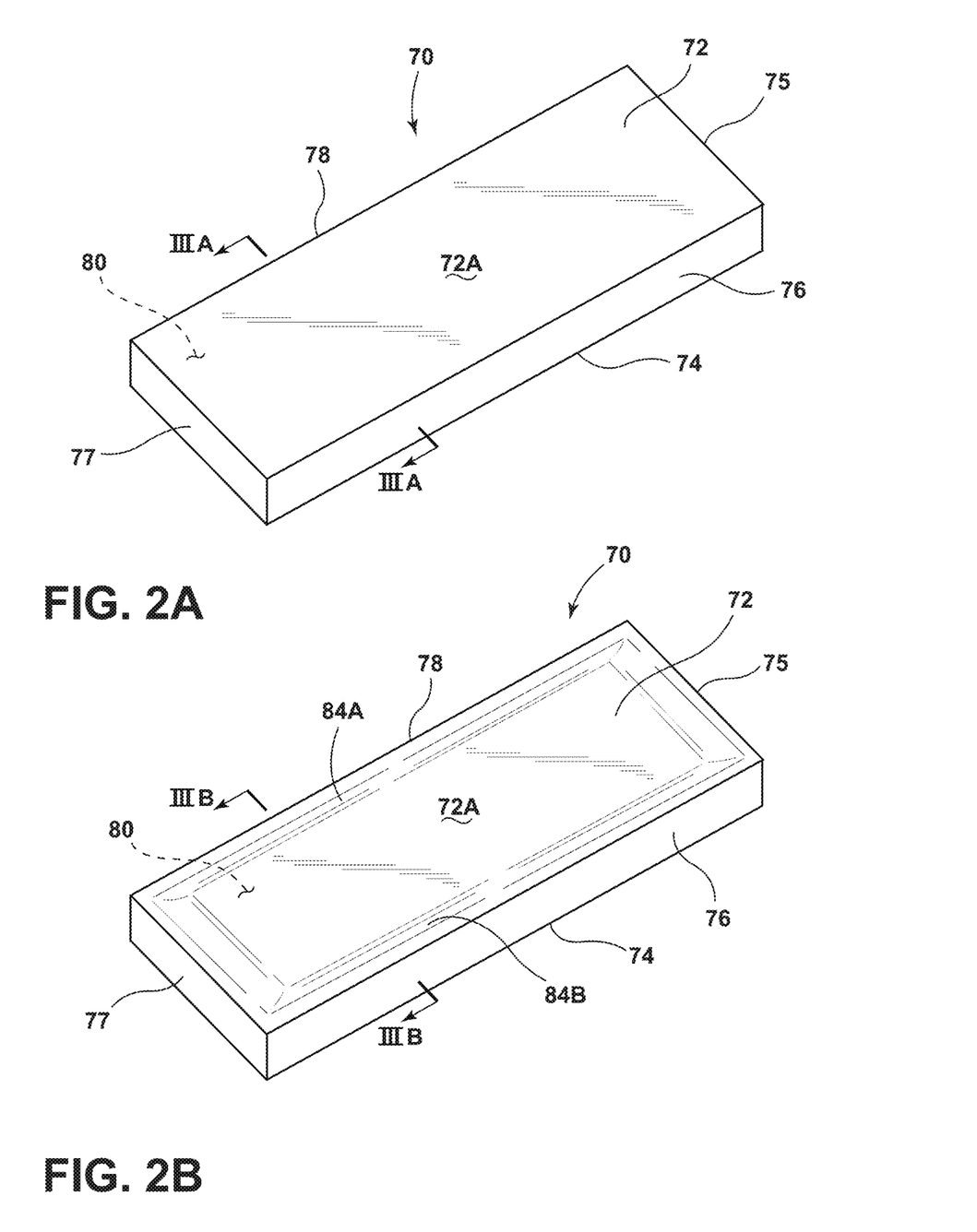
FIG. 2A is a top perspective view of a schematic vacuum insulated cabinet structure prior to a vacuum drawing procedure.
FIG. 2B is a top perspective view of the schematic vacuum insulated cabinet structure of FIG. 2A after a vacuum has been drawn.
Figure 3A:
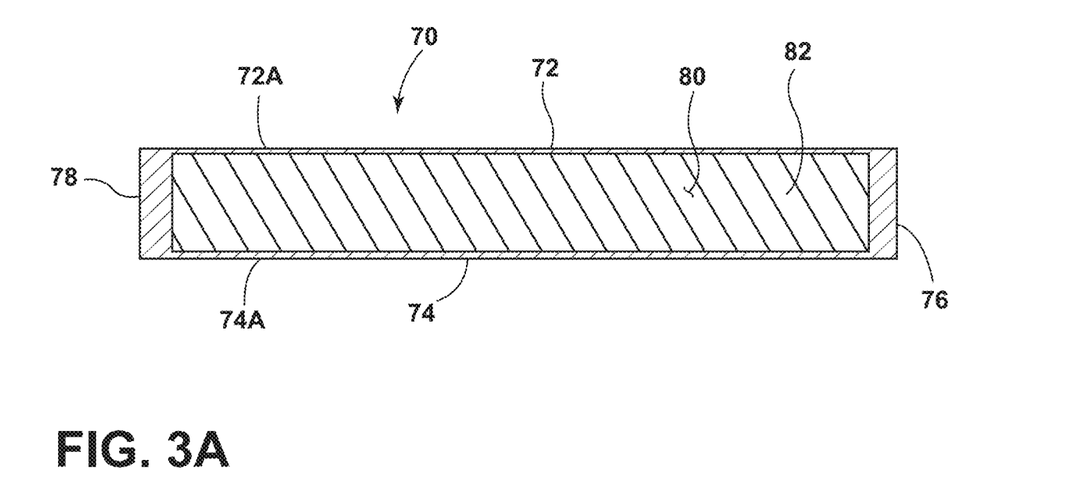
FIG. 3A is a cross-sectional view of the schematic vacuum insulated cabinet structure of FIG. 2A taken at line IIIA.
Figure 3B:
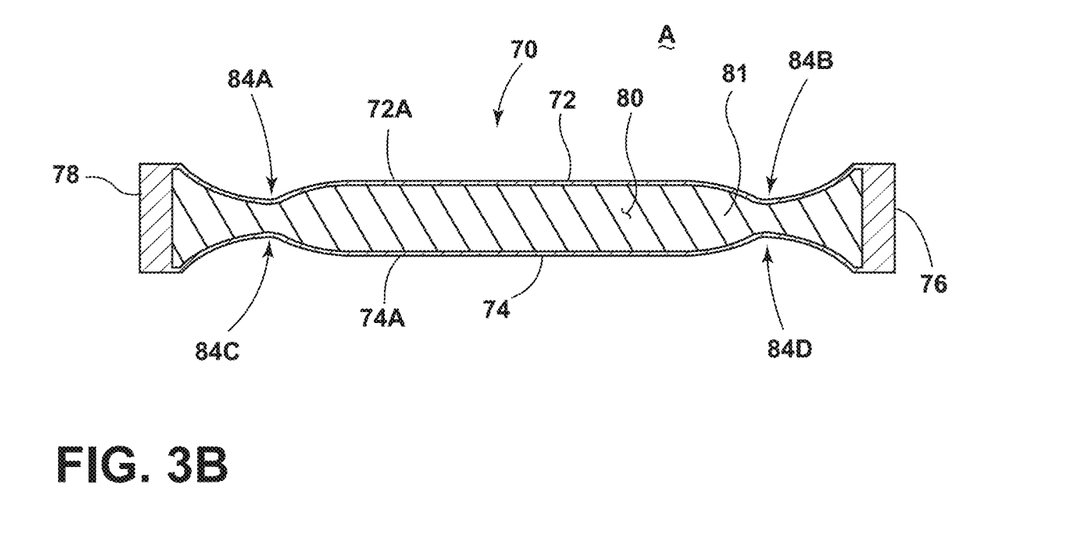
FIG. 3B is a cross-sectional view of the schematic vacuum insulated cabinet structure of FIG. 2B taken at line IIIB.
Figure 4:
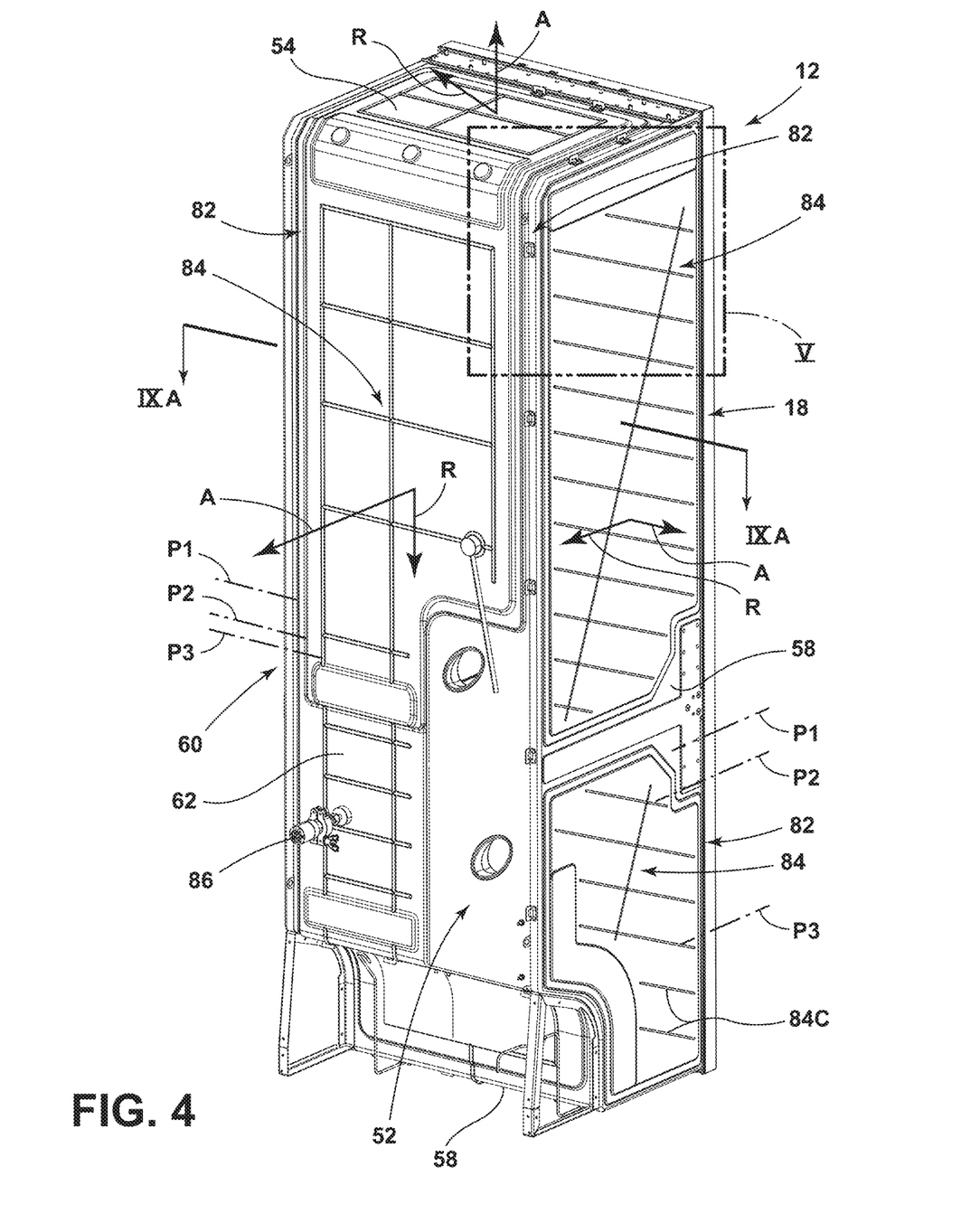
FIG. 4 is a perspective view showing an implementation of a wrapper for the refrigerator of FIG. 1 configured to control deformation due to vacuum draw, according to an aspect of the present disclosure.
Figure 5:
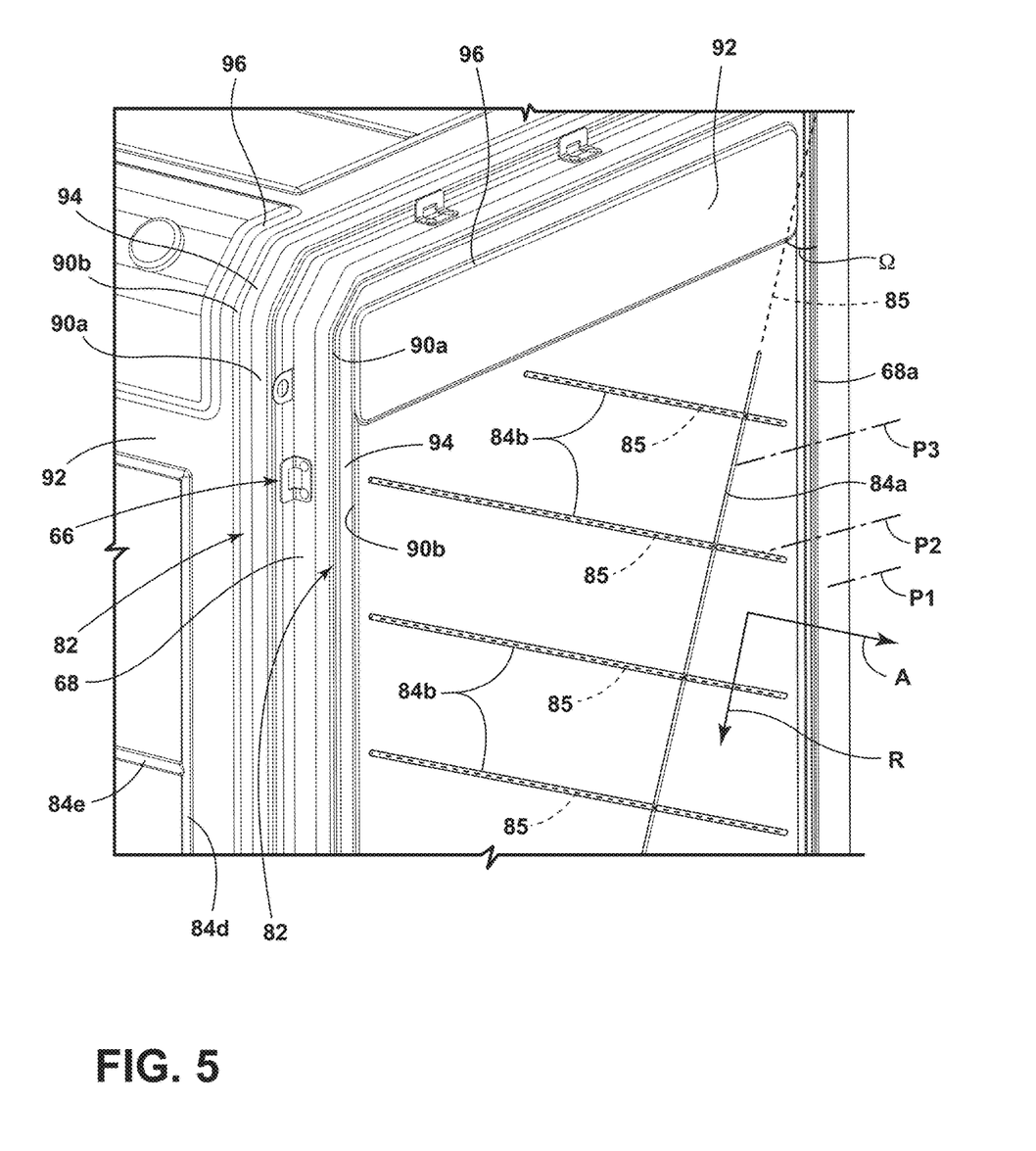
FIG. 5 is a perspective detail view of a portion of the wrapper of FIG. 4.
Figure 6:
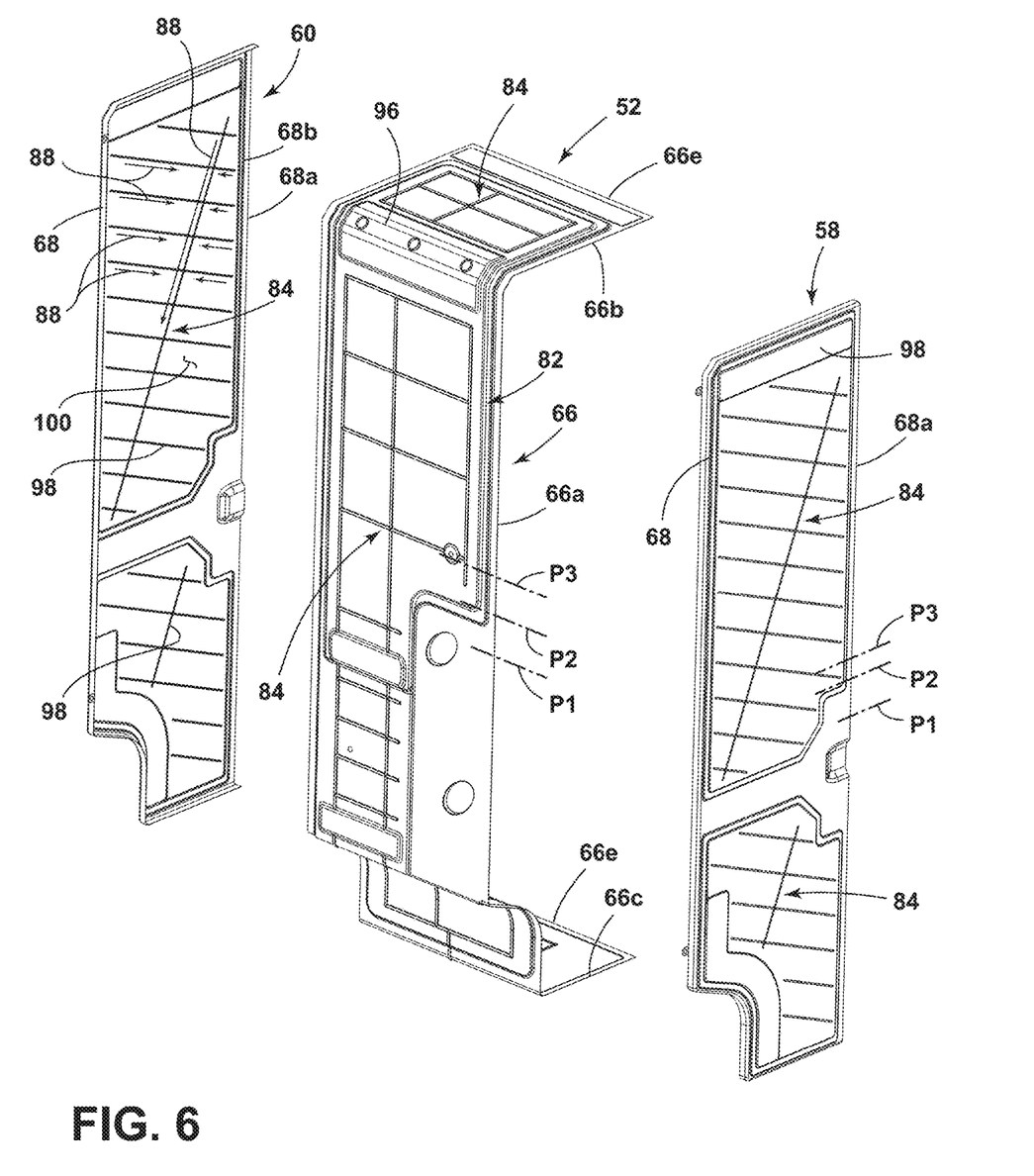
FIG. 6 is an exploded view of the wrapper of FIG. 4.
Figure 7:
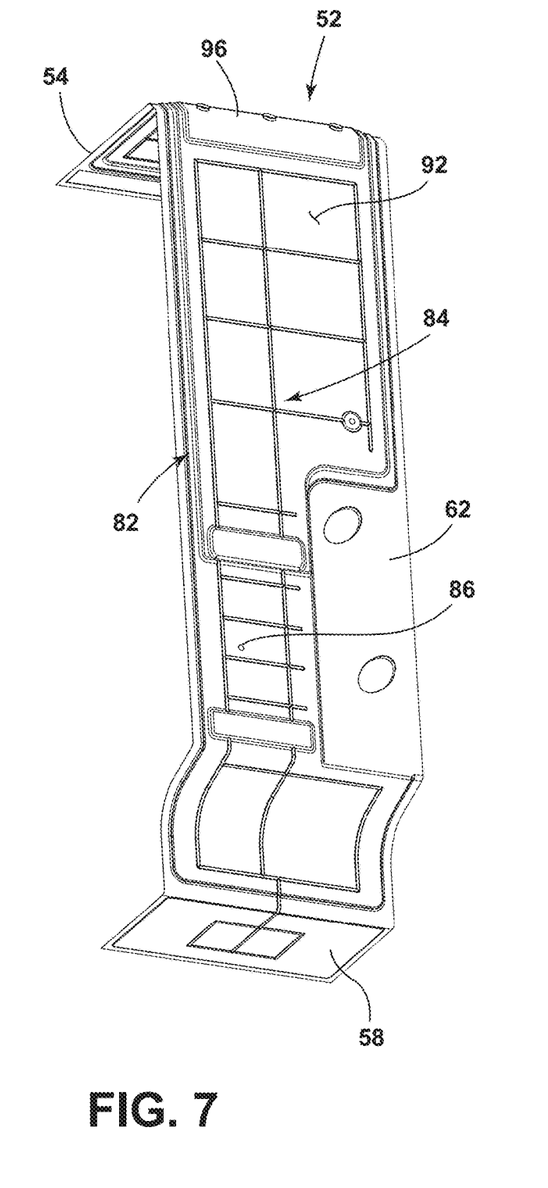
FIGS. 7 and 8 are perspective exterior and interior views of a central member of the wrapper, respectively.
Figure 8:
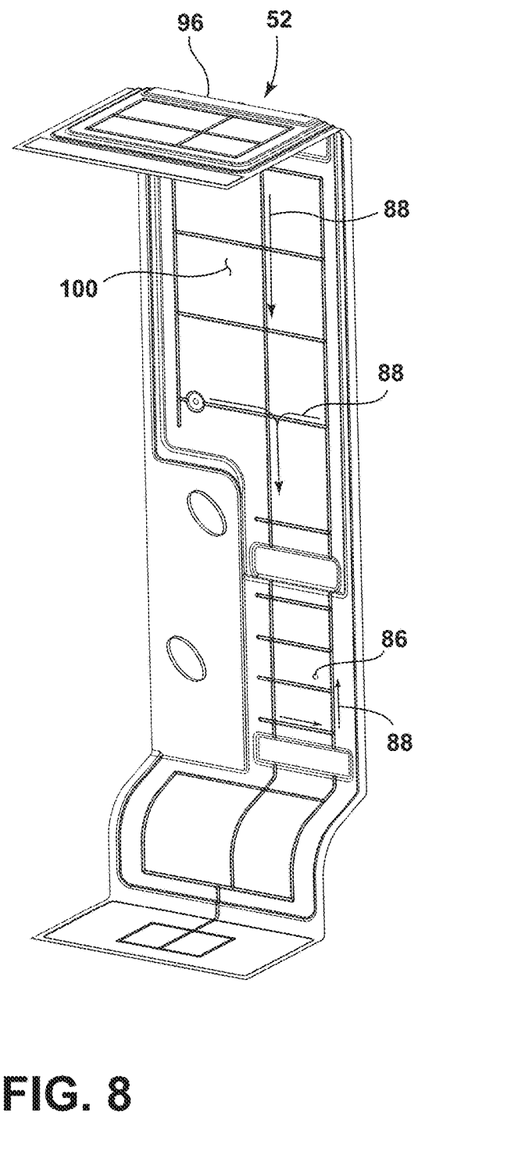

Referring to FIGS. 1A-9B, reference numeral 12 generally designates a vacuum insulated structure. The vacuum insulated structure 12 includes a plurality of cover members, each of a stamped unitary sheet. In this respect, the cover members can comprise the portions of the outer wrapper 18, as well as the liners 20A and 20B, depicted in FIGS. 1A and 1B. In particular, as shown in FIGS. 4 and 6, the outer liner 18 can comprise separate cover members in the form of a central unitary structural member 52 that includes the top wrapper wall 54, the rear wrapper wall 62, and the bottom wrapper wall 56, as well as two side members that entirely comprise each wrapper side wall 58 and 60, with the members being generally and collectively referred to as "cover members." At least one of the cover members 52 and each of the side members 58 and 60 define a perimeter portion 66,68 positioned at a first planar level, which may comprise either of the various planar levels, P1 or P2, discussed further herein, and a deformation control member 82,84 formed in the unitary sheet extending to a second planar level, P2 or P3, spaced outwardly from the first planar level in an axial direction A with respect to the sheet and disposed inward of the perimeter portion 66,68 in a radial direction R with respect to the sheet. The vacuum insulated structure 12 also includes a thermal bridge 22 interconnecting at least portions of the cover members (i.e., the central unitary structural member 52, the side cover members 58,60, the upper liner 30, and the lower liner 32 at the perimeter portions 66,68 (as well as the perimeter portions 31,33 of the upper liner 30 and lower liner 32, respectively) to define an insulating cavity 24 therebetween. The insulating cavity 24 is a sealed cavity having a vacuum drawn therefrom, and the deformation control members 82,84 are configured to reduce deformation of the cover members 52,58,60 in at least an area adjacent the respective deformation control member 82,84 and to define a portion of a path 88 for air flow out of the sealed cavity 24 during a vacuum draw process. In this manner, the present vacuum insulated structure 12 provides an outer wrapper 18 configured to provide a predictable or "controlled" vacuum bow deflection during vacuum draw by way of the deformation control members 82,84. Additionally, the deformation control members 82,84 can limit or visually obscure deflection of the cover members 52,58,60. In certain aspects, the deformation control members 82,84 can also promote air flow during vacuum evacuation of the vacuum insulated structure 12 or can accommodate additional elements or features to promote air draw, as discussed further below.

Figure 1A:
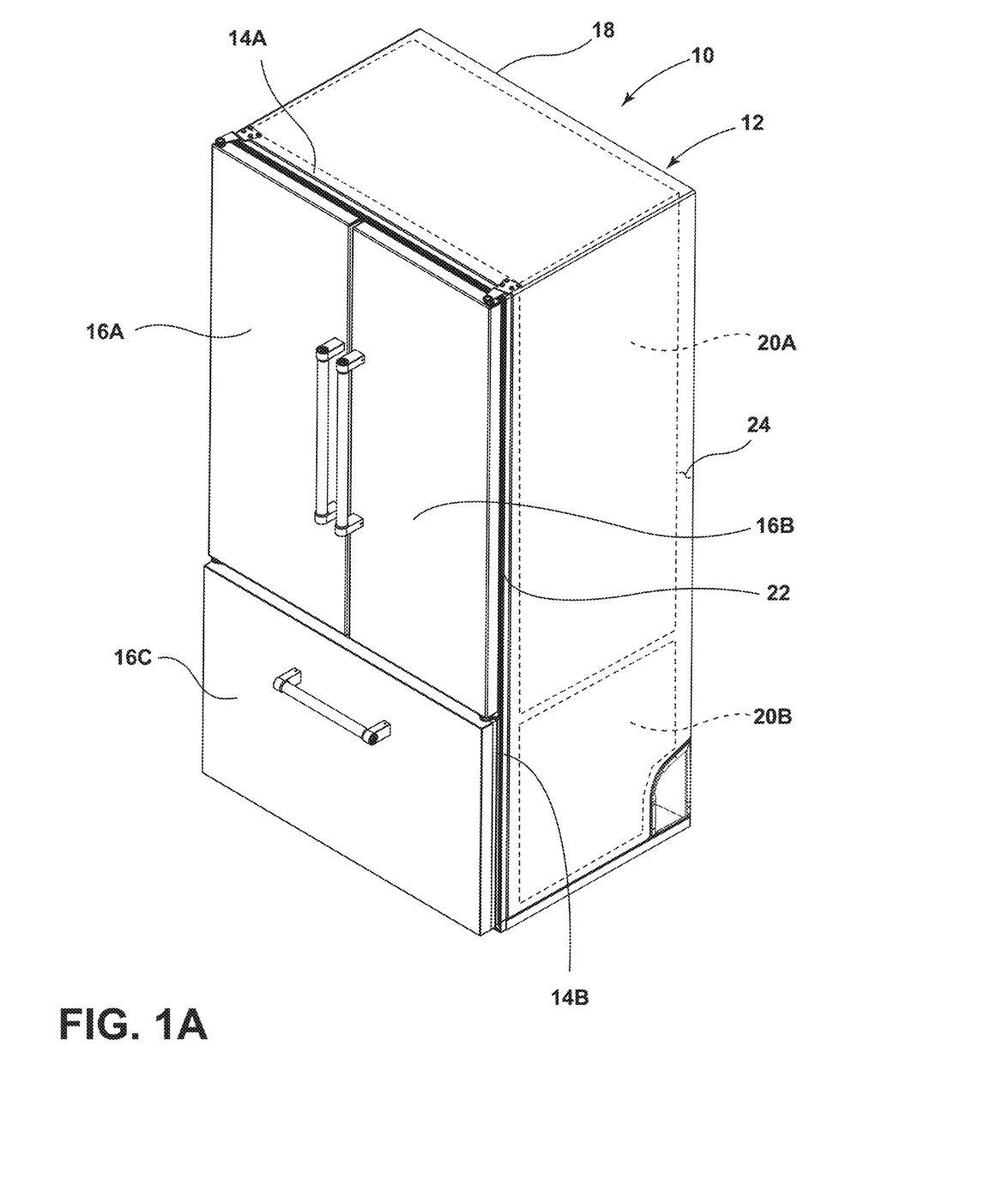
FIG. 1A is an isometric view of a refrigerator including a vacuum insulated cabinet structure.

Referring now to FIG. 1A, a refrigerator 10 is shown having a vacuum insulated cabinet structure 12. The vacuum insulated cabinet structure 12 includes one or more front openings 14A, 14B that may be closed off by doors 16A, 16B and 16C. The doors 16A, 16B are contemplated to pivot between open and closed positions relative to upper front opening 14A. As further found in the illustrated example, door 16C is in the form of a sliding drawer which horizontally slides between open and closed positions for selectively providing access to the lower front opening 14B of the insulated cabinet structure 12.

Figure 1B:
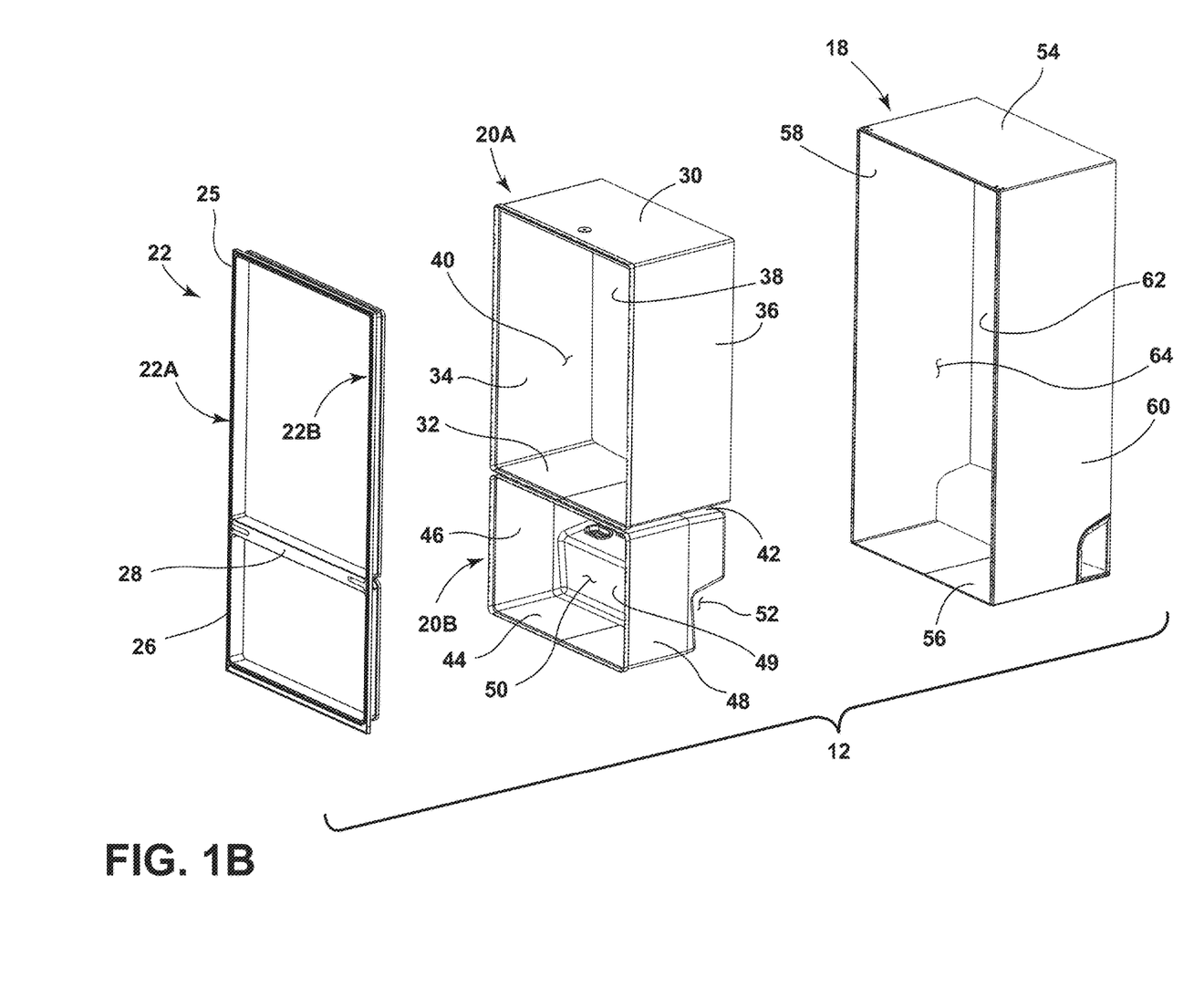
FIG. 1B is an exploded perspective view of another vacuum insulated cabinet structure.

As further shown in FIG. 1A, the vacuum insulated cabinet structure 12 includes an exterior wrapper 18 and upper and lower liners 20A, 20B. In the embodiment shown in FIG. 1A, the upper and lower liners 20A, 20B generally indicate a refrigerator compartment and a freezer compartment, respectively. In assembly, the upper and lower liners 20A, 20B are interconnected with the exterior wrapper 18 via a thermal bridge 22. The thermal bridge 22 is best shown in FIG. 1B. As further shown in FIG. 1A, the exterior wrapper 18 is spaced-apart from the upper and lower liners 20A, 20B to define an insulating cavity 24 therebetween. The insulating cavity 24 is contemplated to be a sealed cavity that may comprise a vacuum core material such as a silica powder or other suitable loose filler material that is inserted (e.g., blown) into the insulating cavity 24 after the exterior wrapper 18, upper and lower liners 20A, 20B and thermal bridge 22 have been coupled together.

Referring now to FIG. 1B, the vacuum insulated cabinet structure 12 is shown in an exploded view. The thermal bridge 22 of the vacuum insulated cabinet structure 12 includes first and second side members 22A and 22B along with upper and lower openings 25, 26 which are configured to align with the upper and lower liners 20A, 20B in assembly. The thermal bridge 22 further includes a mullion portion 28 disposed between the upper and lower openings 25, 26 and extending between the first and second side members 22A, 22B. The upper liner 20A is shown having a top wall 30, a bottom wall 32, opposed side walls 34, 36 and a rear wall 38 (collectively referred to herein as sidewalls) which all cooperate to define a refrigerator compartment 40. Similarly, the lower liner 20B includes a top wall 42, a bottom wall 44, interconnecting sidewalls 46, 48 and a rear wall 49 which all cooperate to define a freezer compartment 50. The rear wall 49 is shown having a stepped configuration to define a spacing 52 which may be used to house various cooling components for cooling both the refrigerator compartment 40 and the freezer compartment 50. The upper and lower liners 20A, 20B may be comprised of a sheet metal material that is folded and welded to define the parameters of the refrigerator compartment 40 and the freezer compartment 50.

As further shown in FIG. 1B, the exterior wrapper 18 includes a top wall 54, a bottom wall 56, opposed sidewalls 58, 60 and a rear wall 62 (collectively referred to herein as sidewalls) which together cooperate to define a receiving cavity 64. The exterior wrapper 18 may be comprised of a sheet metal material that is folded and/or welded to define the parameters of the receiving cavity 64 such that the wrapper 18 is generally of a unitary structure. In assembly, the upper and lower liners 20A, 20B are received in the receiving cavity 64 of the exterior wrapper 18, such that the exterior surfaces of the upper and lower liners 20A, 20B cooperate with the inner surfaces of the exterior wrapper 18 to define the insulating cavity 24 disposed therebetween as shown in FIG. 1A. The insulating cavity 24 may directly receive an insulating material and have a vacuum drawn directly from the insulating cavity 24 to provide a vacuum insulated cabinet structure 12. In this way, the vacuum insulated cabinet structure 12 may include an overall thinner profile to maximize the amount of space available for the refrigerator compartment 40 and the freezer compartment 50 in assembly.

Referring now to FIG. 2A, a schematic assembly 70 is used to describe a deformation effect of a vacuum drawing procedure. The assembly 70 includes first and second cover members 72, 74 that are spaced-apart from one another and interconnected by side members 75-78. The side members 75-78 may be side members of a unitary frame structure to which the first and second cover members 72, 74 are attached. The assembly 70 includes a cavity 80 defined by the first and second cover members 72, 74 as spaced-apart from one another and interconnected by side members 75-78. The cavity 80 may be filled with a particulate material, such as a compressed cake of activated carbon black or silica gel, or a mixture of the two. These fillers are designed to fill the cavity 80 and are placed therein before a vacuum is drawn on the assembly 70. The filler is indicated by reference numeral 81 and is best shown in FIG. 3A.

Referring now to FIG. 2B, the schematic assembly 70 has had a vacuum drawn on the cavity 80, such that the cavity 80 now defines an evacuated cavity 80. By drawing the vacuum on the schematic assembly 70, the first and second cover members 72, 74 have inwardly collapsed towards each other, thereby providing for a deformed outer surface 72A of first cover member 72 as shown in FIG. 2B. The deformation of the schematic assembly 70 shown in FIG. 2B is best depicted in FIG. 3B.

Referring now to FIG. 3A, the cross-sectional view of the schematic assembly 70 shown in FIG. 2A is depicted, wherein the outer surface 72A of the first cover member 72 and an outer surface 74A of the second cover member 74 are shown in substantially planar configurations between side members 78, 76. This configuration shown in FIG. 3A is an ideal configuration for a vacuum insulated structure after a vacuum has been drawn on the schematic assembly 70. However, as noted above, when a vacuum is drawn on the schematic assembly 70 of FIGS. 2A and 3A, a deformed schematic assembly 70, as shown in FIGS. 2B and 3B, is often the result. With specific reference to FIG. 3B, the outer surfaces 72A, 74A of the first and second cover members 72, 74 are no longer planar outer surfaces, but rather inwardly deformed outer surfaces having specific indent deformations 84A-84D which draw the first and second cover members 72, 74 towards one another due to the low pressure of the evacuated cavity 80. The pressure within the evacuated cavity of assembly 70 is contemplated to be less than 10 mbar as compared to an atmospheric pressure of 1 atm or 1013.25 mbar.

In an effort to avoid the vacuum deformation bow shown in the schematic assembly 70 of FIGS. 2A-3B, the present concept includes a vacuum insulated structure having an area configured for controlled deformation. Referring to FIGS. 4-9B, the above-mentioned plurality of cover members are shown, each in the form of a stamped unitary sheet. The outer liner 18 is shown as comprising cover members in the form of a central unitary structural member 52 that includes the top wrapper wall 54, the rear wrapper wall 62, and the bottom wrapper wall 56, as well as two side members that entirely comprise each wrapper side wall 58 and 60. As shown in FIGS. 4 and 5, both the central unitary structural member 52 and each of the side members 58 and 60 define a perimeter portion 66,68 positioned at a first planar level P1 and a deformation control member 82,84 formed in the unitary sheet extending to a second planar level P2 spaced outwardly from the first planar level P1 in an axial direction A with respect to the sheet and disposed inward of the perimeter portion 66,68 in a radial direction R with respect to the sheet (notably, the radial direction R is depicted as a single vector but may correspond with any co-planar vector that is perpendicular to and radiates from the vector designating the axial direction A).

The vacuum insulated structure 12 also includes the thermal bridge 22, such as depicted in FIGS. 1A and 1B, interconnecting the first cover members (i.e., the central unitary structural member 52, the side cover members 58,60, the upper liner 30, and the lower liner 32 at the perimeter portions 66,68 (as well as the perimeter portions 31,33 of the upper liner 30 and lower liner 32, respectively) to define the insulating cavity 24 therebetween. The deformation control members 82,84 are configured to reduce deformation of the cover members 52,58,60 in at least the areas adjacent the respective deformation control member 82,84 and to define respective portions of a path 88 for air flow out of the sealed cavity 24 during a vacuum draw process.

As mentioned above, and as shown in FIG. 6, the above-mentioned cover members include unitary sheets comprising the sides 58 and 60 of the wrapper 18, as well as the central unitary structural member 52. The side cover members 58 and 60 are attached along portions of their respective outer perimeters 68 to corresponding portions of the perimeter 66 of the central member 52. As shown, the portions of the perimeters 68 of the side members 58,60 that are attached with the perimeter 66 of the central member 52 define respective edge portions 68a,68b,68c of the perimeter 68 that align with the top wall 54, rear wall 62, and bottom wall 56 of the wrapper 18, as defined on the central member 52. In this manner, remaining front-top 66a, front-bottom 66b, and front 68d edges of the central member 52 and side members 58 and 60, respectively remain for coupling with the thermal bridge 22 to enclose the cavity 24 by way of additional coupling with the remaining cover members in the form of the upper liner 30 and lower liner 32 (with other configurations possible, depending on the particular configuration of refrigerator 10). In such a configuration, it can be appreciated that the central member 52, in particular, may define multiple first planar levels P1, as the entire outer perimeter 66 thereof follows the shape of the central member 52 around the various walls 54,56,58 of the wrapper 18 defined thereon, the various perimeter planar levels designated as P1, and corresponding axial A and radial R directions, being established with respect to the portions of the perimeter 66 that correspond with the portions thereof surrounding the subject walls 54,56,68. In one aspect of the construction of wrapper 18, the side cover members 58,60 can be welded to the central unit 52, and the resulting outer wrapper 18 to give the wrapper 18 a unitary, impermeable configuration.

Prior to sealing of cavity 24, which may be achieved by sealingly coupling thermal bridge 22 over the liners 22A, 22B and the assembled outer wrapper 18, the cavity 18 can be filled with an insulating filler material in the form of various powders or granular particles that can generally fill the space that comprises the cavity 24. In particular, the insulating filler material can be open celled foam or a microporous filler material which may optionally include particulate reflectors or opacifiers, such as aluminum, flake or carbon black, to reduce transmission of radiation energy through the vacuum insulated structure 12. The cavity 100 may also be filled with an insulating material in the form of a powder comprised of fumed silica, glass beads, processed rice husks, or any combination thereof. The insulating material is contemplated to have a conducting coefficient or thermal conductivity of at least 5 mW/m·K, or lower, to ensure that the insulating properties of the vacuum insulated structure 12 are sound.

The assembled vacuum insulated structure 12 is then subjected to an evacuation process, wherein the cavity 24, accessed via port 86 to draw a vacuum from the cavity 24, thereby providing a low pressure environment within the cavity 24. The low pressure environment of the cavity 24 may include a reduced internal pressure of less than 10 mbar, but may include other pressure settings conditioned on a filler material used in the vacuum insulated structure 12, and also conditioned on the desired insulative value of the vacuum insulated structure 12. As discussed above, the withdrawal of air from cavity 24 and the resulting low pressure environment of cavity 24 causes inwardly-directed forces to be applied to the various walls 54,56,58,60 of the wrapper 18 and the walls 42,44,46,48 of the liners 20A and 20B. As mentioned above, at least some of the walls 54,56,58,60 of the wrapper 18 are configured to direct a majority of the deformative effects of the inwardly-directed forces to within certain areas and to limit the overall deflection to within a specified overall distance. In one such aspect, the central member 52 and the side members 58,60 each include a deformation control member 82 in the form of one or more stepped areas thereof that are each generally defined by a stepped segment 90 that extends to an outward planar level P2 from toward the perimeter planar level P1. In this manner, each of the central member 52 and the side members 58,60 each include an inner surface portion 92 framed by the stepped areas 82, with the inner surface portions 92 being positioned along the outward planar level P2.

As shown in the detail view of FIG. 5, the stepped areas 82 can include multiple steps between the perimeter planar level P1 and the outward planar level P2. In particular, the stepped areas 82 can include a first stepped segment 90a extending from the perimeter planar level P1 toward the outward planar level P2 and a second stepped segment 90b extending from a position generally aligned with an outward-most portion of the first stepped segment 90a and to the outward planar level P2. The stepped segments 90a and 90b can be connected by an intermediate face segment 94 that extends generally parallel to the planar levels P1 and P2. In this manner, the orientation of the stepped segments 90a and 90b in a position generally perpendicular to the planar levels P1 and P2 can strengthen the adjacent areas of the cover members 52, 56, and 58. Additionally, the presence of multiple stepped segments 90a and 90b connected by the face segment 94 can allow the stepped area 82 to collapse inwardly under the inwardly-directed forces generated by the vacuum draw. This can occur by inward flexing of the face segment 94 such that the second stepped segment 90b can move inwardly in a direction generally parallel with the first stepped segment 90a in a generally fan-fold type manner. Additional deformation of the cover member 52, 56, or 58 may occur between the perimeter portion 66 or 68 and the first stepped segment 90a or within the inner face 92 in an area immediately adjacent the second stepped segment 90b. In general, the appearance of deformations in such areas may be less noticeable to an observer by being visually obscured by the adjacent visual features of the stepped area 82. As also shown in FIGS. 4 and 5, the central member 52 may include an additional stepped area 96 that extends to an additional planar level P3 disposed outward of the outer planar level P2. Such additional stepped area 96 can wrap around a portion of central member 52 that includes portions of both the top wall 54 and the rear wall 62 and may provide additional reinforcement of central member 52 and/or additional air flow during vacuum deformation in a manner discussed further below.

As also mentioned above, a further deformation control member is configured as rib 84 that can be positioned along either or both of central member 52 and side members 58 and 60. In particular, the various ribs 84 are positioned along the inner surface portions 92 of the various cover members 52,58, and 60 within the stepped areas 82 and extend from the outward planar level P2 to an additional planar level P3 positioned further outward from the outward planar level P2 in the axial direction A. In one aspect, the ribs 84 can provide structural reinforcement for the inner surface portions 92 such that deflection therealong from the above-described vacuum draw. As can be appreciated, this effect further limits the overall deformation of the cover members 52, 58, and 60 to within the stepped areas 82. Additionally, the presence of the ribs 84, particularly in the illustrated grid patterns, described further below, further serves to visually obscure any deformation that may occur within the inner surface portions 92. In general, the configuration of deformation control members 82 and 84 discussed herein can limit overall deformation of the cover members 52, 58, and 60 to within about 2 mm (for example, as measured at a central point within the inner surface portions 92) of inward deflection relative to the outward planar level P2.

As shown, the various depicted ribs 84 define an open interior portion 98 that extend outwardly from an interior surface 100 of the respective cover member 52,58, or 60, respectively, in the axial direction A. The ribs 84 each extend along a respective axis 85. As shown, the side members 58,60 each include one or more ribs 84a that extend at an oblique angle Ω of between 10° and 40° with respect to the adjacent front edge 68a of the side member 58,60. As shown, each such side member 58,60 defines two such oblique ribs 84a that, in the illustrated example extend at about 30° with respect to the front edge 68a, but may include more such ribs 84a, depending on the particular configuration of the refrigerator 10. Associated with each such oblique rib 84a are a group of secondary ribs 84b, the axes 85 of which extend in a direction oriented between 80° and 100° relative to the direction of the oblique ribs 84a. In the illustrated example, the secondary ribs 84b are oriented at a 90° angle relative to the oblique ribs 84a and intersect a respective one of the oblique ribs 84a at various points therealong. In this manner, the respective open interior portions 98 of the secondary ribs 84b are connected and in communication with the open interior portion of the corresponding oblique rib 84a such that the open interior portions, individually and collectively, define further respective portions of the path 88 for air flow out of the sealed cavity 24 during the vacuum draw process. Additional secondary ribs 84c may be separate from the oblique ribs 84a to maintain visual consistency along the inner surface portion 92. The ribs 84 within the central member 52 may include horizontal ribs 84*d* and vertical ribs 84*e* that also define open interior portions 98 that intersect to define an additional network of interconnected portions of the air flow path 88.

As discussed above, the sealed cavity 24 may be filled with an insulating material prior to sealing and vacuum draw. Notably, during vacuum draw, the inward deformation of portions of the various cover members, including of central member 52 and side members 58 and 60, as well as any deformation that may occur within various portions of liners 20A and 20B may compress the insulating material such that any voids therein or space between particles may be restricted or partially closed. In one aspect, the vacuum draw process pulls air from and through such voids or open spaces such that the closure or restriction thereof may inhibit the vacuum draw process, either requiring more time to complete vacuum draw or making the desired final pressure level more difficult to achieve. In this manner, the grid formation of ribs 84*a* and 84*b*, as well as 84*d* and 84*e* may provide areas where any filler material within the open interiors 98 thereof is compressed to a lesser extent during vacuum draw such that the corresponding portions of the air flow path 88 remain relatively unobstructed such that air may, at least in part, be drawn from adjacent portions of the filler material within the cavity 24 into the open interior portions 98 to provide a less obstructed path 88 for air flow than may otherwise be realized.

Figure 9A:
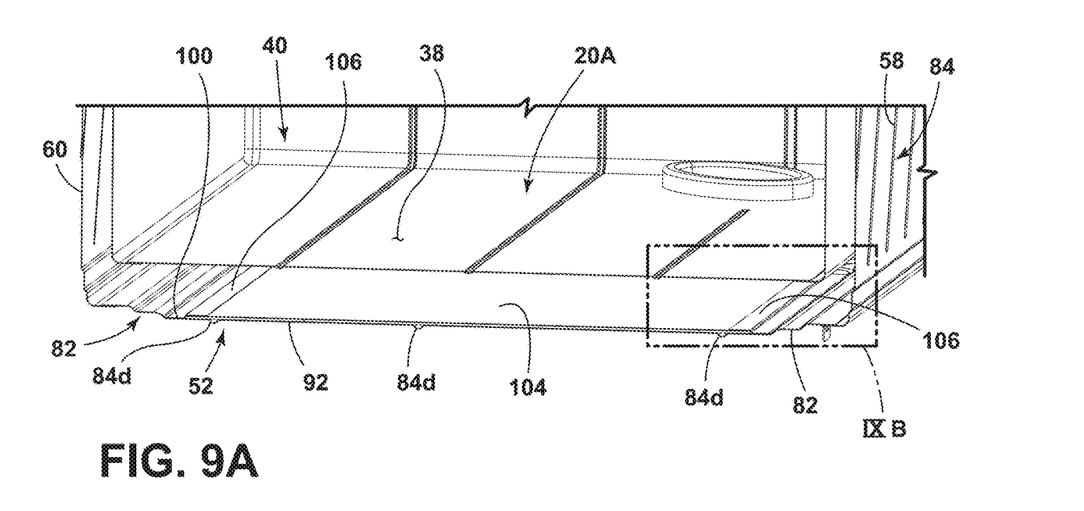
FIGS. 9A and 9B are cross-sectional and detail views of an interior of the vacuum insulated structure of the refrigerator.
Figure 9B:
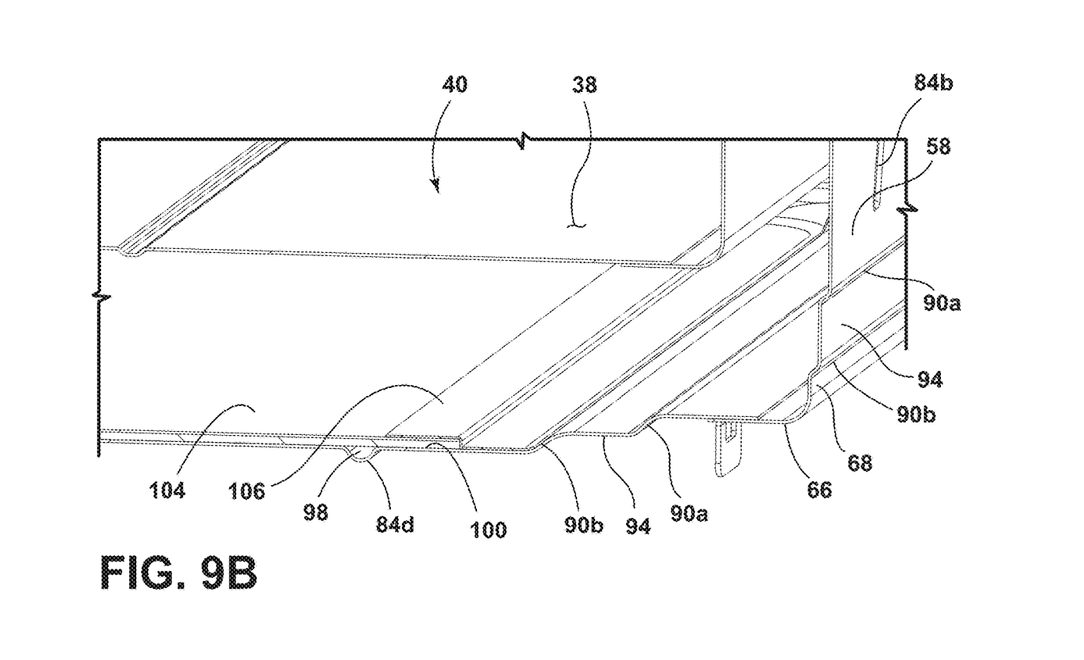

Additionally, as shown in FIGS. 9A and 9B, an interior area 102 of cavity 24 defined within the stepped areas 82 (i.e. along the interior of inner surface portion 92) can receive a mesh material layer 104 therein. In one aspect, the mesh material layer 104 can be generally rigid, so as to resist compression during the vacuum draw process, and porous. Due to its rigidity, the mesh material layer 104 can maintain its porosity during the vacuum draw process and can maintain the insulating material out of the interior area 102 during the vacuum draw process such that an additional route for air flow out of cavity 24 is provided. As shown, the mesh material layer 104 can overlie the port 86 such that air drawn therethrough, in particular, has a relatively unobstructed path to the port 86. The mesh material layer 104 can be held to the interior area 102 with one or more strips of filter paper 106 that may be adhered to a portion of the mesh material layer 104 and an adjacent portion of the interior surface 100 of the central member 52, including within the stepped area 82. Similar to the mesh material layer, the filter paper 106 may be air permeable but can have a small enough void or pore size to not be permeated by the adjacent insulating material.

The invention disclosed herein is further summarized in the following paragraphs and is further characterized by combinations of any and all of the various aspects described therein.

According to another aspect of the present disclosure, a vacuum insulated structure includes a first cover member of a stamped unitary sheet defining a perimeter portion positioned at a first planar level and a deformation control member formed in the unitary sheet extending to a second planar level spaced axially outward and disposed radially inward of the perimeter portion. The vacuum insulated structure also includes a second cover member and a thermal bridge interconnecting the first cover member and the second cover member at the perimeter portions thereof to define an insulating cavity therebetween. The insulating cavity is a sealed cavity having a vacuum drawn therefrom, and the first deformation control member is configured to reduce deformation of the first cover member in at least an area adjacent the deformation control member and to define a portion of a path for air flow out of the sealed cavity during a vacuum draw process.

The deformation control member is configured as a first rib defining an open interior portion extending axially outward of an inner surface of the first cover member. The rib extends along an axis disposed at an angle of between 15° and 40° with respect to an edge of the cover member comprising the perimeter portion.

The axis of the first rib is disposed at about 30° with respect to the edge.

The first rib is one of a plurality of ribs comprising a first group of ribs extending in a first direction and a second group of ribs extending in a second direction oriented between 30° and 50° relative to the first direction.

Each of the ribs define respective open interior portions extending axially outward of an inner surface of the first cover member portion to define further respective portions of the path for air flow out of the sealed cavity during the vacuum draw process.

The vacuum insulated structure further includes an insulating material disposed within the insulating cavity. The path for air flow out of the sealed cavity during the vacuum draw process facilitates removal of air from within the insulating material.

The first deformation control member is a stepped area defined by a stepped segment of the first cover member extending to the second planar level from toward the first planar level. The vacuum insulating structure further includes a mesh material layer received in the stepped area and configured to maintain the insulating material out of the portion of the air flow path defined within the stepped area.

The vacuum insulated structure further includes an air permeable member adhered between a portion of the mesh material layer and a portion of an interior surface of the first cover member.

According to yet another aspect, a refrigerator includes a first cover member of a stamped unitary sheet defining a perimeter portion positioned at a first planar level and a deformation control member formed in the unitary sheet extending to a second planar level spaced axially outward and disposed radially inward of the perimeter portion. The deformation control member is configured as a first rib defining an open interior portion extending axially outward of an inner surface of the first cover member. The rib extends along an axis disposed at an angle of between 15° and 40° with respect to an edge of the cover member comprising the perimeter portion. The refrigerator further includes a second cover member and a thermal bridge interconnecting the first cover member and the second cover member at the perimeter portions thereof to define an insulating cavity therebetween. The insulating cavity is a sealed cavity having a vacuum drawn therefrom, and the first deformation control member is configured to reduce deformation of the first cover member in at least an area adjacent the rib.

The open interior portion of the first rib defines a portion of a path for air flow out of the sealed cavity during a vacuum draw process.

The first rib is one of a plurality of ribs comprising a first group of ribs extending in a first direction and a second group of ribs extending in a second direction oriented between 30° and 50° relative to the first direction. Each of the plurality of ribs define respective, interconnected open interior portions to further define the path for air flow.

The axis of the first rib is disposed at about 30° with respect to the edge

The first cover member is a side wall of an outer wrapper of the refrigerator, the second cover member is an inner liner disposed inward of the outer wrapper, and the thermal bridge surrounds an opening to an inner cavity of the refrigerator defined by the inner liner. The refrigerator further includes at least one door operably closing the opening.

The first cover member is a side wall of an outer wrapper of the refrigerator, and the second cover member is a unitary structural portion of the outer wrapper that defines a rear wall, a top wall, and a bottom wall of the outer wrapper. The second cover member is coupled to the first cover member along bottom, rear, and side edges of the perimeter portion. The thermal bridge interconnects the first cover member and the second cover member between a front edge of the first cover member and both a top-front edge and a bottom-front edge of the second cover member.

The second cover member defines a stepped area defined by a stepped segment of the second cover member within at least one of the rear wall and the top wall.

According to yet another aspect, a refrigerator includes a first cover member of a stamped unitary sheet defining a perimeter portion positioned at a first planar level and a deformation control member formed in the unitary sheet extending to a second planar level spaced axially outward and disposed radially inward of the perimeter portion. The deformation control member is configured as a stepped area defined by a stepped segment of the first cover member extending to the second planar level from toward the first planar level. The refrigerator further includes a second cover member, a thermal bridge interconnecting the first cover member and the second cover member at the perimeter portions thereof to define an insulating cavity therebetween, an insulating material disposed within the insulating cavity, and a mesh material layer received in the stepped area. The insulating cavity is a sealed cavity having a vacuum drawn therefrom, and the first deformation control member is configured to reduce deformation of the first cover member in at least an area adjacent the deformation control member and to define a portion of a path for air flow out of the sealed cavity during a vacuum draw process. The mesh material layer is configured to maintain the insulating material out of the portion of the air flow path defined within the stepped area.

The refrigerator further includes an air permeable member adhered between a portion of the mesh material layer and a portion of an interior surface of the first cover member.

The stepped segment of the deformation control member is a first stepped segment. The stepped area is further defined by a second stepped segment extending from the first planar level toward the second planar level, and the second stepped segment is disposed radially inward of the first stepped segment.

The first cover member is a unitary structural portion of an outer wrapper of the refrigerator that defines a rear wall, a top wall, and a bottom wall of the outer wrapper. The stepped area is a first stepped area, and the first cover member defines a second stepped area within the top wall of the unitary structural portion. The second cover member is a side wall of an outer wrapper of the refrigerator and is coupled to the first cover member along bottom, rear, and side edges of the perimeter portion. The thermal bridge interconnects the first cover member and the second cover member between a front edge of the first cover member and both a top-front edge and a bottom-front edge of the second cover member.

The second cover member includes a first rib defining an open interior portion extending axially outward of an inner surface of the first cover member. The rib extends along an axis disposed at an angle of between 15° and 40° with respect to an edge of the cover member comprising the perimeter portion.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated structure, comprising:
 a first cover member of a stamped unitary sheet defining
  a perimeter portion positioned at a first planar level and a deformation control member formed in the unitary sheet extending to a second planar level spaced axially outward and disposed radially inward of the perimeter portion;
 a second cover member; and
 a thermal bridge interconnecting the first cover member and the second cover member at the perimeter portions thereof to define an insulating cavity therebetween, wherein the insulating cavity is a sealed cavity having a vacuum drawn therefrom, and further wherein the deformation control member is configured to reduce deformation of the first cover member in at least an area adjacent the deformation control member and to define a portion of a path for air flow out of the sealed cavity during a vacuum draw process.

2. The vacuum insulated structure of claim 1, wherein the deformation control member is configured as a first rib defining an open interior portion extending axially outward of an inner surface of the first cover member, the first rib extending along an axis disposed at an angle of between 15° and 40° with respect to an edge of the cover member comprising the perimeter portion.

3. The vacuum insulated structure of claim 2, wherein the axis of the first rib is disposed at about 30° with respect to the edge.

4. The vacuum insulated structure of claim 3, wherein the first rib is one of a plurality of ribs comprising a first group of ribs extending in a first direction and a second group of ribs extending in a second direction oriented between 80° and 100° relative to the first direction.

5. The vacuum insulated structure of claim 4, wherein each of the plurality of ribs defines an open interior portion extending axially outward of an interior surface of the first cover member such that the plurality of ribs define further respective portions of the path for air flow out of the sealed cavity during the vacuum draw process.

6. The vacuum insulated structure of claim 1, further including an insulating material disposed within the insulating cavity, wherein:
the path for air flow out of the sealed cavity during the vacuum draw process facilitates removal of air from within the insulating material.

7. The vacuum insulated structure of claim 6, wherein the first deformation control member is a stepped area defined by a stepped segment of the first cover member extending to the second planar level from the first planar level, the vacuum insulating structure further including:
a mesh material layer received in the stepped area and configured to maintain the insulating material out of the portion of the air flow path defined within the stepped area.

8. The vacuum insulated structure of claim 7, further including an air permeable member adhered between a portion of the mesh material layer and a portion of an interior surface of the first cover member.

9. A refrigerator, comprising:
a first cover member of a stamped unitary sheet defining a perimeter portion positioned at a first planar level and a deformation control member formed in the unitary sheet extending to a second planar level spaced axially outward and disposed radially inward of the perimeter portion, the deformation control member being configured as a first rib defining an open interior portion extending axially outward of an inner surface of the first cover member, the first rib extending along an axis disposed at an angle of between 15° and 40° with respect to an edge of the cover member comprising the perimeter portion;
a second cover member; and
a thermal bridge interconnecting the first cover member and the second cover member at the perimeter portions thereof to define an insulating cavity therebetween, wherein the insulating cavity is a sealed cavity having a vacuum drawn therefrom, and further wherein the first deformation control member is configured to reduce deformation of the first cover member in at least an area adjacent the first rib.

10. The refrigerator of claim 9, wherein the open interior portion of the first rib defines a portion of a path for air flow out of the sealed cavity during a vacuum draw process.

11. The refrigerator of claim 10, wherein the first rib is one of a plurality of ribs comprising a first group of ribs extending in a first direction and a second group of ribs extending in a second direction oriented between 80° and 100° relative to the first direction, each of the plurality of ribs defining respective, interconnected open interior portions to further define the path for air flow.

12. The refrigerator of claim 9, wherein the axis of the first rib is disposed at about 30° with respect to the edge of the cover member comprising the perimeter portion.

13. The refrigerator of claim 9, wherein:
the first cover member is a side wall of an outer wrapper of the refrigerator;
the second cover member is an inner liner disposed inward of the outer wrapper; and
the thermal bridge surrounds an opening to an inner cavity of the refrigerator defined by the inner liner, the refrigerator further including at least one door operably closing the opening.

14. The refrigerator of claim 9, wherein:
the first cover member is a side wall of an outer wrapper of the refrigerator;
the second cover member is a unitary structural portion of the outer wrapper that defines a rear wall, a top wall, and a bottom wall of the outer wrapper, the second cover member being coupled to the first cover member along bottom, rear, and side edges of the perimeter portion; and
the thermal bridge interconnects the first cover member and the second cover member between a front edge of the first cover member and both a top-front edge and a bottom-front edge of the second cover member.

15. The refrigerator of claim 14, wherein the second cover member defines a stepped area defined by a stepped segment of the second cover member within at least one of the rear wall and the top wall.

16. A refrigerator, comprising:
a first cover member of a stamped unitary sheet defining a perimeter portion positioned at a first planar level and a deformation control member formed in the unitary sheet extending to a second planar level spaced axially outward and disposed radially inward of the perimeter portion, the deformation control member being configured as a stepped area defined by a stepped segment of the first cover member extending to the second planar level from the first planar level;
a second cover member;
a thermal bridge interconnecting the first cover member and the second cover member at the perimeter portions thereof to define an insulating cavity therebetween;
an insulating material disposed within the insulating cavity; and
a mesh material layer received in the stepped area;
wherein:
the insulating cavity is a sealed cavity having a vacuum drawn therefrom;
the first deformation control member is configured to reduce deformation of the first cover member in at least an area adjacent the deformation control member and to define a portion of a path for air flow out of the sealed cavity during a vacuum draw process; and the mesh material layer is configured to maintain the insulating material out of the portion of the air flow path defined within the stepped area.

17. The refrigerator of claim 16, further including an air permeable member adhered between a portion of the mesh material layer and a portion of an interior surface of the first cover member.

18. The refrigerator of claim 16, wherein the stepped segment of the deformation control member is a first stepped segment, the stepped area being further defined by a second stepped segment extending from the first planar level toward the second planar level, the second stepped segment being disposed radially inward of the first stepped segment.

19. The refrigerator of claim 16, wherein:

the first cover member is a unitary structural portion of an outer wrapper of the refrigerator that defines a rear wall, a top wall, and a bottom wall of the outer wrapper, the stepped area being a first stepped area, and the first cover member defining a second stepped area within the top wall of the unitary structural portion;

the second cover member is a side wall of the outer wrapper of the refrigerator, the second cover member being coupled to the first cover member along bottom, rear, and side edges of the perimeter portion; and the thermal bridge interconnects the first cover member and the second cover member between a front edge of the first cover member and both a top-front edge and a bottom-front edge of the second cover member.

20. The refrigerator of claim 19, wherein the second cover member includes a first rib defining an open interior portion extending axially outward of an inner surface of the first cover member, the first rib extending along an axis disposed at an angle of between 15° and 40° with respect to an edge of the cover member comprising the perimeter portion.

\* \* \* \* \*